US012609611B2

(12) United States Patent
Messick et al.

(10) Patent No.: US 12,609,611 B2
(45) Date of Patent: Apr. 21, 2026

(54) SYSTEM AND METHOD TO ADDRESS ERROR IN LOAD SHARING POWER SUPPLY UNITS

(71) Applicant: Dell Products L.P., Round Rock, TX (US)

(72) Inventors: Douglas E. Messick, Austin, TX (US); Craig Anthony Klein, Elgin, TX (US); Wayne Kenneth Cook, Round Rock, TX (US); John Erven Jenne, Georgetown, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/415,741

(22) Filed: Jan. 18, 2024

(65) Prior Publication Data

US 2025/0239934 A1 Jul. 24, 2025

(51) Int. Cl.
H02M 3/04 (2006.01)
(52) U.S. Cl.
CPC ..................................... H02M 3/04 (2013.01)
(58) Field of Classification Search
None
See application file for complete search history.

(56) References Cited

U.S. PATENT DOCUMENTS

| | | | |
|---|---|---|---|
| 9,239,601 B2 | 1/2016 | Messick et al. | |
| 9,632,552 B2 | 4/2017 | Messick et al. | |
| 10,955,890 B2 | 3/2021 | Messick et al. | |
| 11,237,611 B2 | 2/2022 | Messick et al. | |
| 2020/0142465 A1* | 5/2020 | Jenne | G06F 1/3206 |
| 2022/0210377 A1* | 6/2022 | Kagan | G01R 22/066 |
| 2022/0318154 A1* | 10/2022 | Fuller | G06F 12/0891 |
| 2023/0315183 A1 | 10/2023 | Messick et al. | |

OTHER PUBLICATIONS

Paul Artman, et al., "Modular Hardware System-Common Redundant Power Supply (M-CRPS) Base Specification," Version 1.00 Release Candidate 4, Open Compute Project M-CRPS, Nov. 1, 2022, pp. 1-320.

* cited by examiner

*Primary Examiner* — Rexford N Barnie
*Assistant Examiner* — Aqeel H Bukhari
(74) *Attorney, Agent, or Firm* — Fogarty LLP

(57) ABSTRACT

Systems and methods support load sharing between multiple power supply units (PSUs). An example, analog control signals used to control the PSUs may generate power outputs from one or more of the PSUs, where the power outputs may be outside of the desired range. Systems and methods may apply a feedback loop to compare power output to analog control signal levels and then to adjust analog control signal levels accordingly.

20 Claims, 6 Drawing Sheets

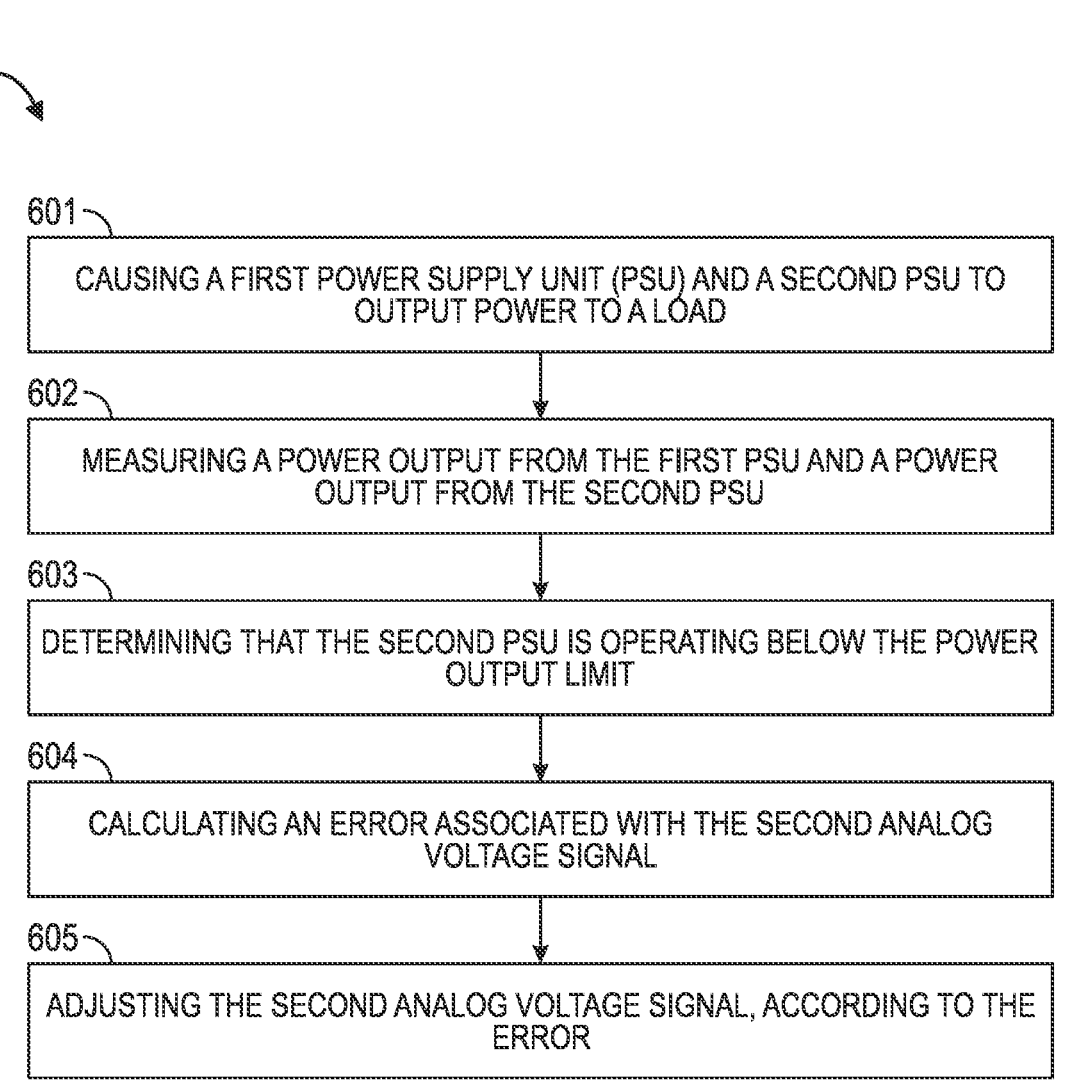

600

601
CAUSING A FIRST POWER SUPPLY UNIT (PSU) AND A SECOND PSU TO OUTPUT POWER TO A LOAD

602
MEASURING A POWER OUTPUT FROM THE FIRST PSU AND A POWER OUTPUT FROM THE SECOND PSU

603
DETERMINING THAT THE SECOND PSU IS OPERATING BELOW THE POWER OUTPUT LIMIT

604
CALCULATING AN ERROR ASSOCIATED WITH THE SECOND ANALOG VOLTAGE SIGNAL

605
ADJUSTING THE SECOND ANALOG VOLTAGE SIGNAL, ACCORDING TO THE ERROR

FIG. 6

SYSTEM AND METHOD TO ADDRESS ERROR IN LOAD SHARING POWER SUPPLY UNITS

FIELD

The present disclosure relates generally to information handling systems, and more particularly to power management for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Further, information handling systems that are configured to perform critical functions such as, for example, server devices in a datacenter, are often provided with redundant power supplied through power sources. Power sources may be coupled to Power Supply Unit (PSUs) to power the server devices. There is a need in the art for improved power delivery.

SUMMARY

In various embodiments, a method includes: causing a first power supply unit (PSU) and a second PSU to output power to a load, wherein the first PSU and the second PSU are each subject to a power output limit, including outputting a first analog voltage signal to the first PSU at a first level corresponding to the power output limit and outputting a second analog voltage signal to the second PSU at the first level; measuring a power output from the first PSU and a power output from the second PSU; determining that the second PSU is operating below the power output limit; calculating an error associated with the second analog voltage signal; and adjusting the second analog voltage signal, according to the error.

In some embodiments, a system includes: a server device having a plurality of CPUs (Central Processing Units); a first power supply and a second power supply, coupled to the server device and configured to provide power to the server device, wherein the first power supply and the second power supply are each subject to a power output limit and are each configured to output a same power level to the server device; a management controller, configured to communicate with the CPUs and with the first power supply and the second power supply, wherein the management controller is configured to: cause the first power supply and the second power supply to output power to the server device, including providing a first analog voltage signal to a pin of the first power supply at a first level and providing a second analog voltage signal to a pin of the second power supply at the first level; measure a power output from the first power supply and a power output from the second power supply; determine that the second power supply is operating below the power output limit; determine an error amplitude associated with operation of the second power supply according to the first level and the power output from the second power supply; and adjust the second analog voltage signal from the first level, according to the error amplitude.

In some embodiments, a computer-readable storage device having instructions stored thereon for supplying load sharing power to a device by a first power supply unit (PSU) and a second PSU, wherein execution of the instructions by one or more processors of a management controller of the device causes the one or more processors to: monitor power output by the first PSU and the second PSU; determine that the first PSU is operating below a level of the second PSU; determine an error associated with operation of the first PSU, wherein the error is associated with an analog control voltage applied to the first PSU and with a power output level of the first PSU; adjust the analog control voltage according to the error; measure a resulting power output level of the first PSU after adjusting the analog control voltage; and either adjust the analog control voltage again or allow the analog control voltage to remain at a level based on measuring the resulting power output level.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 6 is an illustration of an example method for controlling a PSU, according to various embodiments.

DETAILED DESCRIPTION

Figure 1:
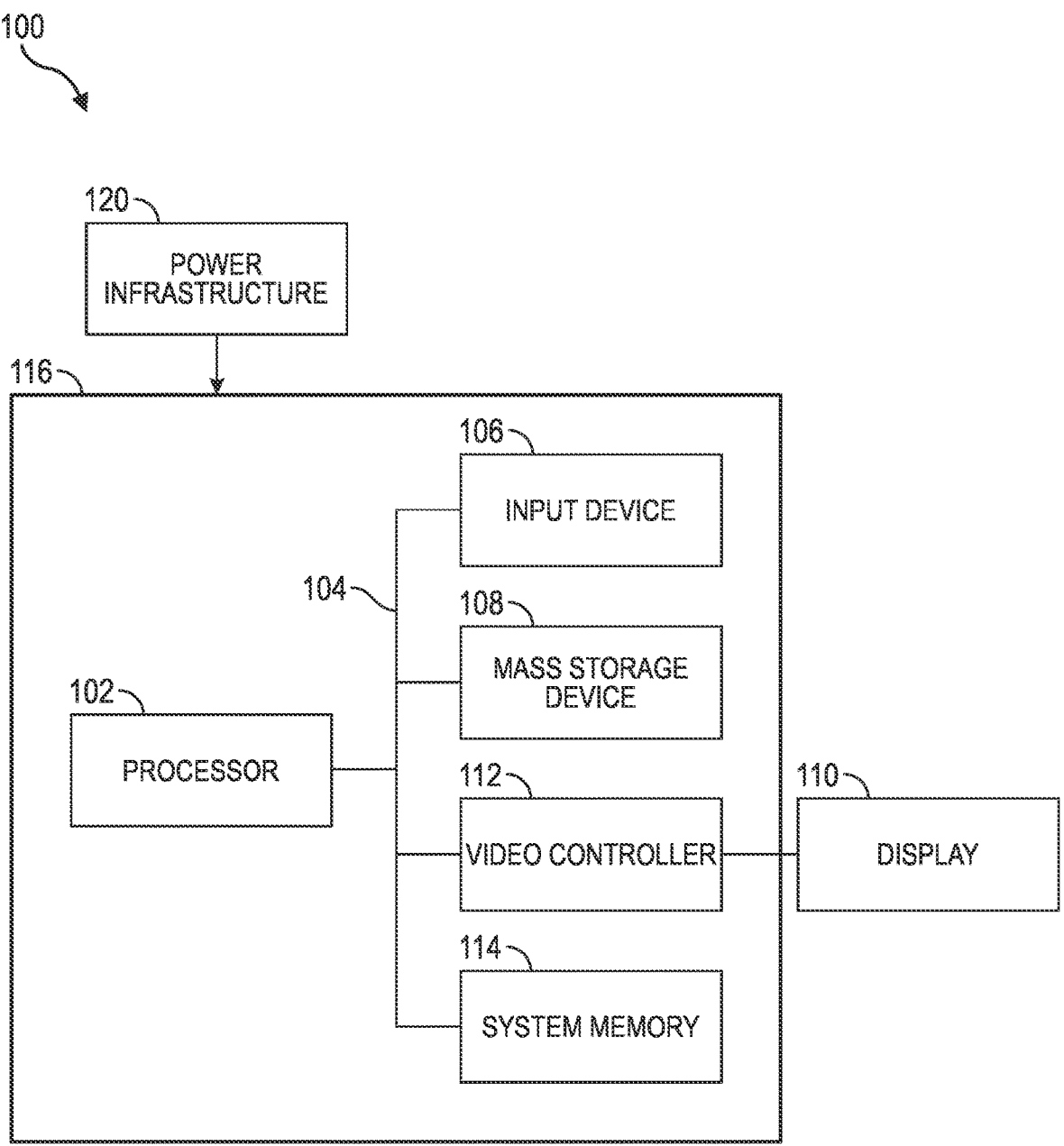
FIG. 1 is an illustration of an example information handling system (IHS), according to various embodiments.

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claims.

Servers with multiple Power Supply Units (PSUs) may incorporate a PSU feature called Load Balancing such that each PSU in the system provides the same amount of power. A typical 1 U server with two PSUs running at 1,000 W will have each PSU provide 500 W to the system. Ideally each PSU shares an identical load, but it is known that the feature operates within a margin of error defined by a specification. For instance, the Open Compute Project (OCP) Modular Hardware System-Common Redundant Power Supply (M-CRPS) Base Specification provides a current sharing accuracy of +/−2%.

When PSUs run at their faceplate power or programmable power limit, any error in the current sharing feature may be expected to reduce system power. In one example, only one PSU can run at the limit while other PSUs run at reduced power based on the current sharing error. For example, two PSUs in a system may have a direct current (DC) output limit of 500 W each. If the current sharing accuracy is +2% error, that means one PSU may run at 500 W while the other PSU is limited to 490 W. In this case the current sharing accuracy artificially limits the power and performance by 10 W. Any reduction in power at the limit may directly affect performance of the server device that is powered by the PSUs.

Various implementations seek to address the error by employing circuits and methods to drive different voltages to control pins of the PSUs with the goal of causing each PSU to output equal power. In one example implementation, analog voltage control signal error is calculated by measuring a control pin voltage for each PSU and also measuring energy output for each PSU. The control pin voltage may be converted to the digital domain, and in the digital domain, a processor may generate an expected control pin voltage for each measured power output. The processor may then compare, for each PSU, the measured control pin voltage to the expected control pin voltage. The result of the comparison is an error value.

Continuing with the example, the processor may then program an amplitude of the error into a digital adjustment circuit for each PSU. The digital adjustment circuits may then cause analog voltage generation circuitry to generate analog voltage control signals for the control pins at each PSU. In one example, the analog control voltages may be different for each PSU, whereas the power output from each PSU may be equal or substantially equal, at least within a defined margin. In the example above with two PSUs, where one PSU runs at 500 W and the other PSU runs at 490 W, the error correction feature may operate to cause both PSUs to run at 500 W by increasing the analog control voltage for the PSU that had been running at 490 W.

Various implementations may provide advantages over present solutions. For instance, some implementations may reduce the PSU load balancing error, thereby freeing up trapped power and enabling a system to increase performance. For instance, in the example above in which one of the PSUs had been running at 490 W and was increased to 500 W, the extra 10 W may increase performance (e.g., processing speed) of a server being powered by the PSUs. Additionally, some implementations may provide this increased performance, even in view of constraints, such as load balancing mandates and stressed power infrastructure. Various implementations may increase performance by decreasing the analog control voltage error at a faceplate power limit, a programmable power limit, and in multi-PSU servers.

FIG. 1 is an illustration of an example information handling system (IHS) 100, according to various embodiments. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., smart phone), server (e.g., blade server or rack server), a network storage device, or any other suitable device and may vary in size, shape, performance, functionality, and price.

The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112.

A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Continuing with the example, the IHS 100 receives power from power infrastructure 120. The power infrastructure 120 may be designed and controlled, such as illustrated below with respect to FIGS. 3-6, to tune out PSU load sharing error.

Figure 2:
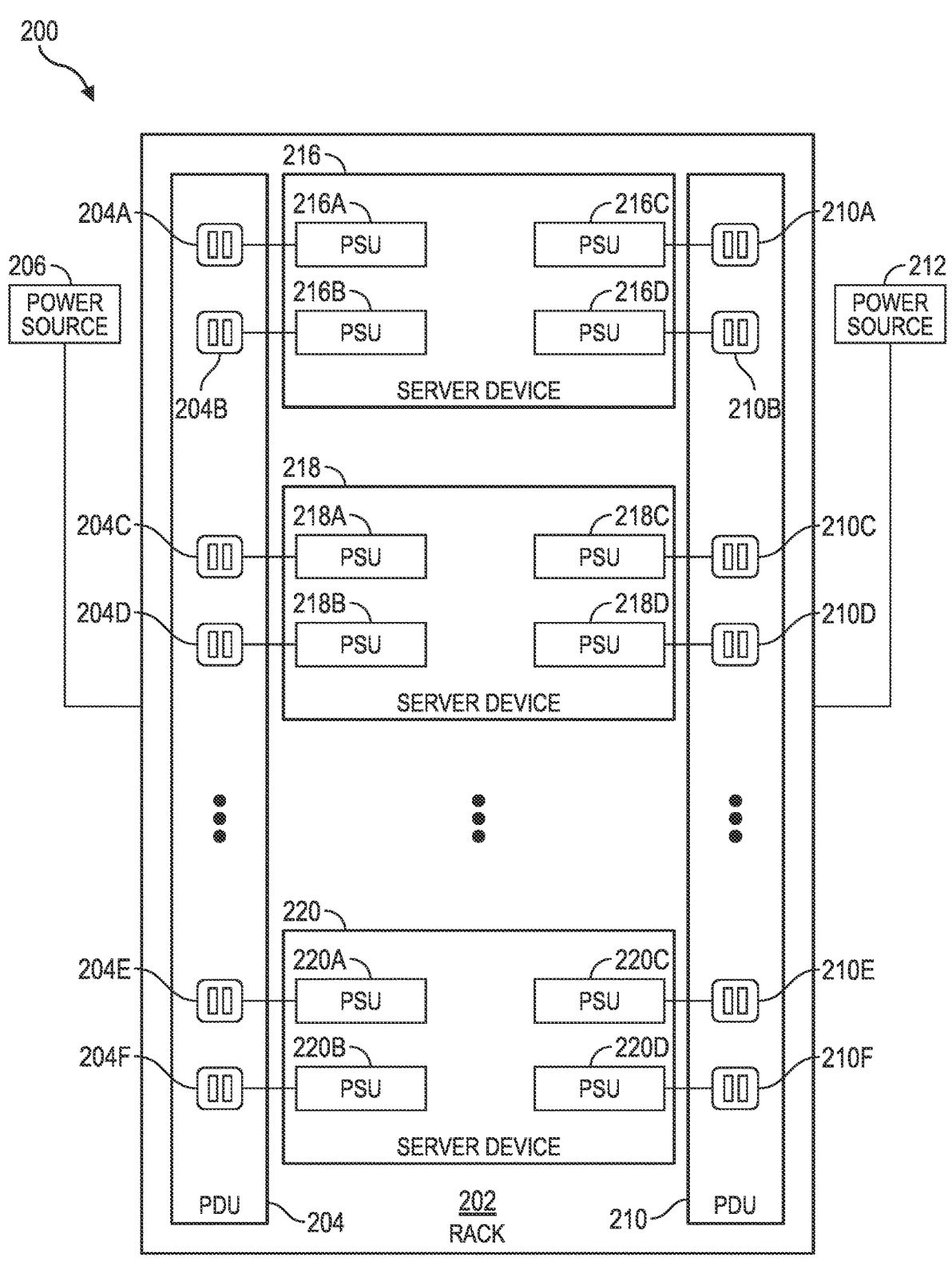
FIG. 2 is an illustration of an example power management system, which serves multiple server devices, each one of the server devices being an example of an IHS, such as in the example IHS of FIG. 1, according to various embodiments.

Referring now to FIG. 2, an embodiment of a power management system 200 according to the teachings of the present disclosure is illustrated. The various power sources, power distribution units, and PSUs of FIG. 2 are an example of the power infrastructure 120 of FIG. 1.

In the illustrated embodiment, the power management system 200 includes a rack 202 that, in the examples provided below, is a server rack that is used to house a plurality of server devices. However, in other embodiments, the rack 202 may be omitted, used to house other types of devices. The rack 202 includes a power distribution unit (PDU) 204 that is coupled to a power source 206. The rack 202 also includes a PDU 210, which is coupled to a power source 212. The power sources 206 and 212 may be the same or different and may be connected to a local power utility company, on-site generator, or other appropriate utility.

In the illustrated embodiment, the rack 202 includes a plurality of server devices 216, 218, and up to 220, any or all of which may be provided by the IHS 100 discussed above with reference to FIG. 1, and/or that may include any or all of the components of the IHS 100. Each of the plurality of server device 216-220 includes a plurality of power supply units (PSUs) such as the PSUs 216A, 216B, 216C, and 216D included in the server device 216; the PSUs 218A, 218B, 218C, and 218D included in the server device 218; and the PSUs 220A, 220B, 220C, and 220D included in the server device 220. In the illustrated embodiment, the PSUs 216A and 216B in the server device 216 are connected to the PDU 204 via its respective power connections 204A and 204B, the PSUs 218A and 218B in the server device 218 are connected the PDU 204 via its respective power connections 204C and 204D, and the PSUs 220A and 220B in the server device 220 are connected the PDU 204 via its respective power connections 204 E and 204 F.

Similarly, the PSUs 216C and 216D in the server device 216 are connected to the PDU 210 via its respective power connections 210A and 210B, the PSUs 218C and 218D in the server device 218 are connected the PDU 210 via its respective power connections 210C and 210D, and the PSUs 220C and 220D in the server device 220 are connected the PDU 210 via its respective power connections 210 E and 210 F. While a specific power management system 200 is illustrated and described herein, a wide variety of modification to the power management system 200 illustrated in FIG. 2 fall within the scope of the present disclosure well, including different numbers of power sources and/or PDUs providing power to the server devices 216-220, different numbers of PSUs provided in the server devices 216-220, etc.

In one example, PSU 216A and PSU 216B may be configured in a load sharing arrangement in which each one of PSU 216A and PSU 216B are configured to output a same amount of power to a load in server device 216. (The same may be true of the other paired PSUs in server device 216 and in the other server devices 218-220 as well.) Various implementations described herein may reduce error in load sharing PSU devices, thereby allowing those PSU devices to operate at desired levels.

Figure 3:
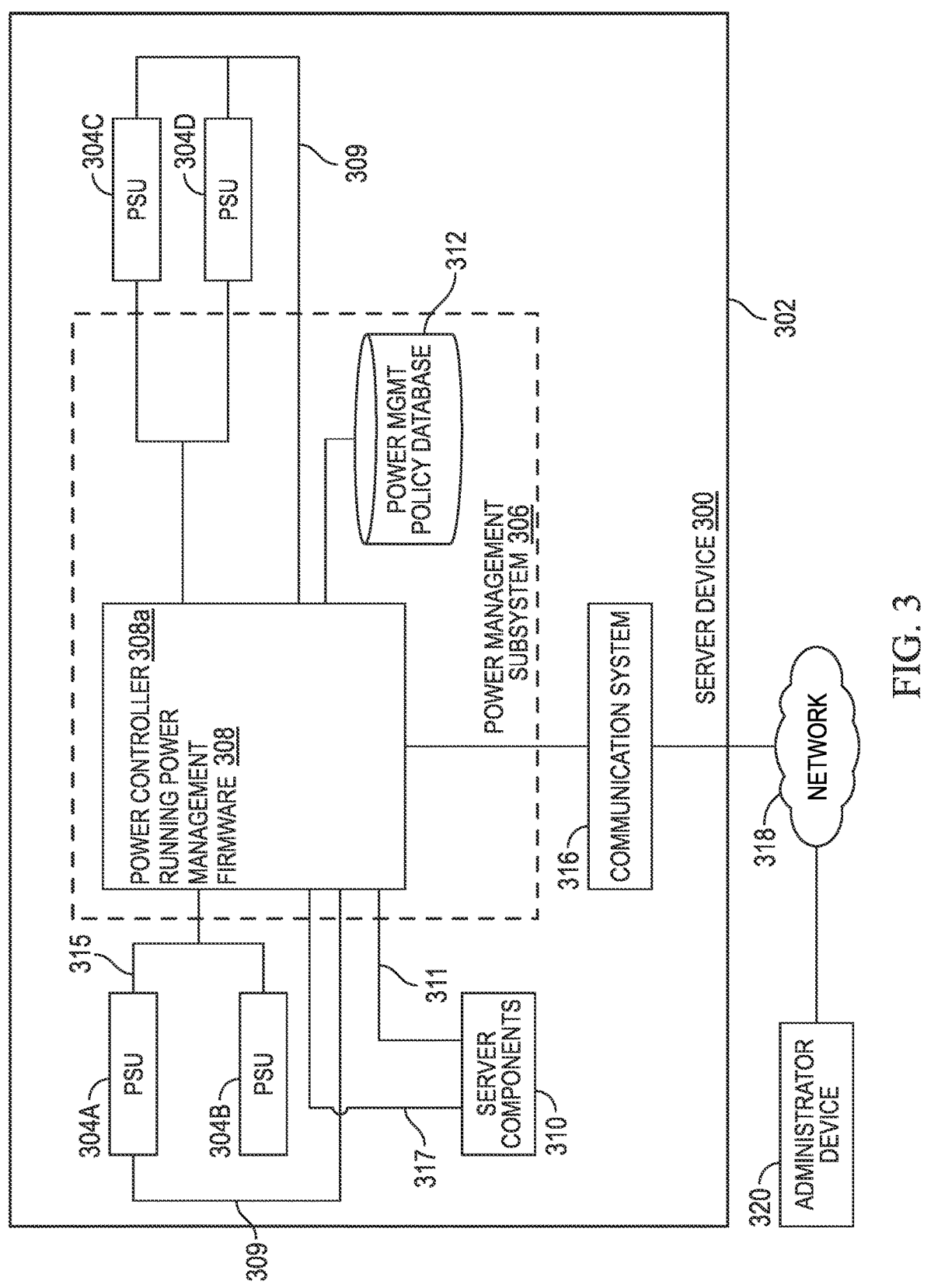
FIG. 3 is an illustration of an example server device, according to various embodiments.

Referring now to FIG. 3, an embodiment of a server device 300 that may be utilized in the power management system of the present disclosure is illustrated. The server device 300 may be provided as any or all of the server devices 216-220 discussed above with reference to FIG. 2 and, as such, the server device 300 may be provided by the IHS 100 discussed above with reference to FIG. 1, and/or may include some or all of the components of the IHS 100. Furthermore, as also discussed above with regard to the server devices 216-220, the server device 300 may be replaced with networking devices, storage devices, and/or other computing devices while remaining within the scope of the present disclosure as well.

In the illustrated embodiment, the server device 300 includes a chassis 302 that houses the components of the server device 300, only some of which are illustrated in FIG. 3. For example, in the illustrated embodiment, the chassis 302 houses PSUs 304A, 304B, 304B, and 304D, which in the examples below may correspond to the PSUs 216A, 216B, 216C, and 216D included in the server device 216, respectively; the PSUs 218A, 218B, 218C, and 218D included in the server device 218, respectively; and/or the PSUs 220A, 220B, 220C, and 220D included in the server device 220, respectively. As such, the PSUs 304A and 304B may be coupled to the power source 206, and the PSUs 340C and 304D may be coupled to the power source 212.

The chassis 302 also houses a power management subsystem 306 that, in the illustrated embodiment, includes power controller 308A running power management firmware 308. For example, the power controller 308A may be provided on a Baseboard Management Controller (BMC) such as, for example, the integrated DELL® Remote Access Controller (iDRAC) available from DELL® Inc. of Round Rock, Texas, United States. However, other components may be utilized to provide the functionality of the power management firmware 308 and power management subsystem 306 discussed below while remaining within the scope of the present disclosure.

In the examples discussed below, the power management firmware 308 is configured (e.g., via combinations of hardware and software) to perform the power management functionality discussed below (i.e., in addition to conventional system management firmware functionality performed by the system management firmware 306). For instance, PSUs, such as PSU 304A and PSU 304B as well as PSU 304C and PSU 304D may be coupled in pairs and configured to operate according to load sharing constraints. For instance, PSU 304A and PSU 304B may be configured to provide power to server device 300 at equal amounts (e.g., 500 W each), and the same may be true of PSU 304C and PSU 304D. Furthermore, power management firmware 308, running on power controller 308A, may be configured to reduce or eliminate load sharing errors, as discussed in more detail below.

In the illustrated embodiment, the power controller 308A is coupled to each of the PSUs 304A-304D via coupling(s) 309 between the power controller 308A and the PSUs 304A-304B, as well as to server components 310 that are housed in the chassis 302 via coupling(s) 311 between the power controller 308A and the server components 310. For example, the couplings 309 and/or 311 may be provided by one or more digital bus systems or analog control signals. In an embodiment, the server components 310 may include processing systems (not illustrated, but which may include the processor 102 discussed above with reference to FIG. 1), memory systems (not illustrated, but which may include the memory 114 discussed above with reference to FIG. 1), networking systems, and/or any other server components. The power controller 308A is also coupled to a storage device (not illustrated, but which may include the storage device 108 discussed above with reference to FIG. 1) that is housed in the chassis 302 and that includes a power management policy database 312 that is configured to store any of the information utilized by the power management subsystem 306.

The chassis 302 may also house a communication system 316 that is coupled to the power controller 308A in the power management subsystem 306, and that may include a Network Interface Controller (NIC), a wireless communication subsystem (e.g., a BLUETOOTH® communication subsystem, a Near Field Communication (NFC) subsystem, a WiFi communication subsystem, etc.), and/or other wireless communication components. As illustrated, the communication system 316 may be coupled (e.g., via an Ethernet connection) to a network 318 that may be provided by a Local Area Network (LAN), the Internet, and/or other networks, and an administrator device 320 (e.g., a desktop computing device, a laptop/notebook computing device, a tablet computing device, a mobile phone, etc.) may be coupled to the network 318 as well to allow the communications between the administrator device 320 and the server device 300.

While a specific server device 300 has been illustrated and described, server devices may include a variety of components for providing conventional server device functionality, while remaining within the scope of the present disclosure as well.

Figure 4:
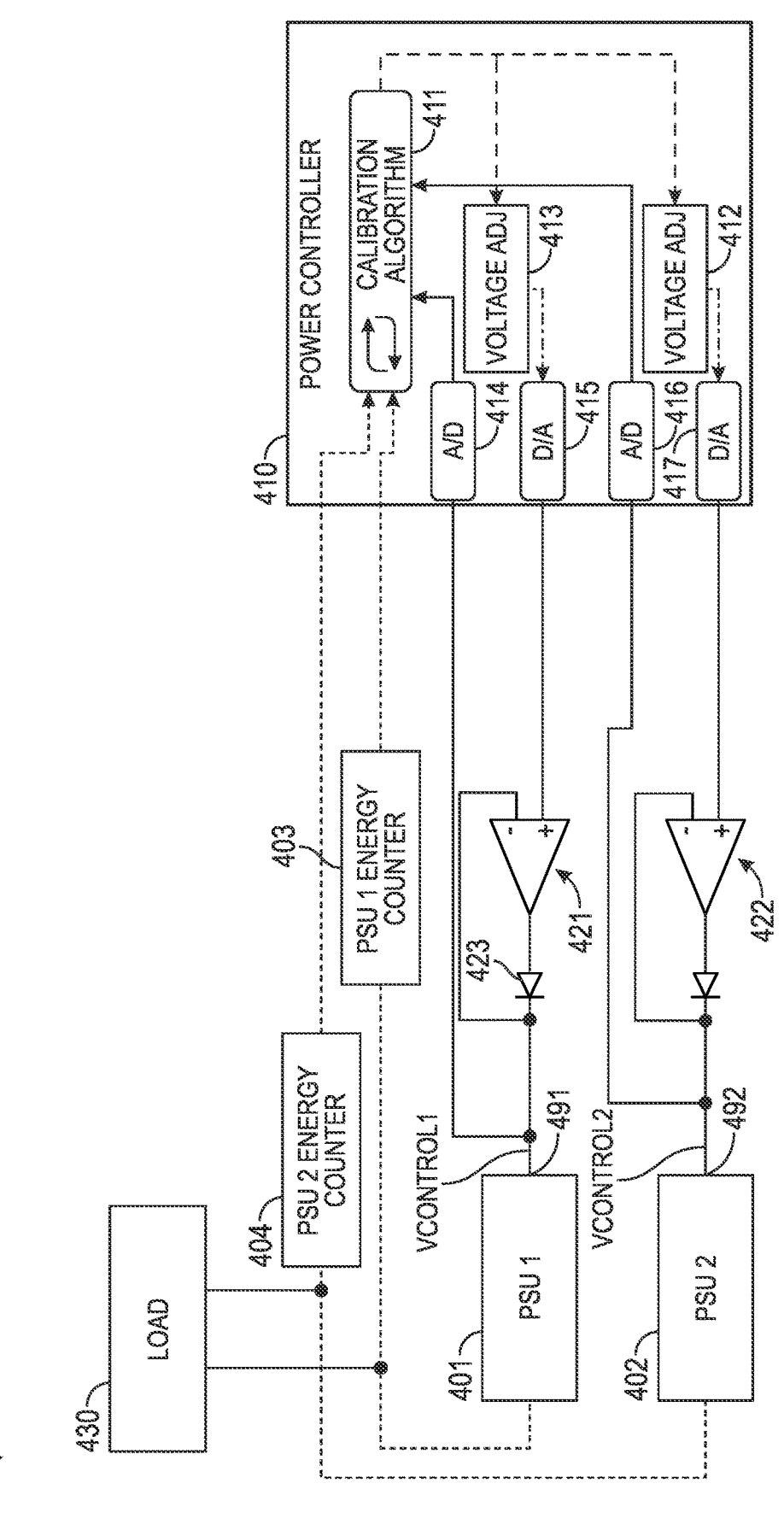
FIG. 4 is an illustration of an example system for controlling power supply units (PSUs), according to various embodiments.

FIG. 4 is an illustration of an example system 400, according to various embodiments. System 400 includes PSU 401 and PSU 402, which may be paired in a load sharing arrangement. For instance, PSU 401 and PSU 402 may be configured to provide equal power to load 430 (e.g., 500 W each). In the example of FIG. 4, PSU 401 and PSU 402 may be illustrative of the various PSUs described above with respect to FIGS. 2 and 3. Furthermore, the load 430 may be illustrative of IHS 100, any of the server devices 216-220, or server device 300 (FIGS. 1-3), a data storage device, a networking device, or the like.

System 400 further includes power controller 410, which may be illustrative of power controller 308A of FIG. 3. For instance, power controller 410 may be implemented as a BMC or other appropriate processing device and configured to run computer-executable code (software or firmware) to provide the functionality described with respect to FIGS. 5-6. The various components of an example system 400 are arranged in a feedback loop, as described in more detail below.

Energy counter 403 is coupled to an output of PSU 401, and energy counter 404 is coupled to an output of PSU 402. For instance, PSU 401 and PSU 402 are configured to provide power to load 430, and each of energy counters 403, 404 may tap output lines to measure, e.g., voltage and current over time. In the present example, energy counters 403, 404 include transducers to measure energy as well as analog-to-digital converters so that energy counters 403, 404 may provide digital output to the power controller 410. The digital output is indicative of the energy measurements at energy counters 403, 404, and the digital output may specifically be provided to calibration algorithm 411. Calibration algorithm 411 may be implemented with computer-executable code (e.g., firmware or software) that is executed by power controller 410.

Each of the PSUs 401, 402 receives a respective analog voltage control signal Vcontrol 1 and Vcontrol 2 at their control pins 491, 492. In one example, a voltage level of 5 V of either of the voltage control signals may be, at least nominally, configured to cause each of the PSUs 401, 402 to output 500 W. Thus, the PSUs 401, 402 may be configured to provide a total of 1000 W to load 430. Continuing with the example, a voltage level of 4 V may be configured to cause each of the PSUs 401, 402 to output 400 W. In other words, there may be a linear relationship between the voltage level of Vcontrol 1 and Vcontrol 2 and the power outputs of each of PSU 401 and PSU 402.

The analog voltage control signals Vcontrol 1 and Vcontrol 2 may be an implementation of a standard voltage control signal, such as the Ishare signal provided by OCP M-CRPS. However, the scope of embodiments is not limited to any particular signal or standard.

Calibration algorithm 411 receives a measurement of a voltage level of Vcontrol 1 through analog-to-digital converter 414 and receives a measurement of a voltage level of Vcontrol 2 through analog-to-digital converter 416. Calibration algorithm 411 may control a level of Vcontrol 1 by sending a digital signal to digital voltage adjustment circuit 413, which outputs a digital value to digital-to-analog converter 415. Similarly, calibration algorithm 411 may control a level of Vcontrol 2 by sending another digital signal to digital voltage adjustment circuit 412, which outputs a digital value to digital-to-analog converter 417.

Digital-to-analog converter 415 may translate its received digital value into an analog voltage level, which it applies to a noninverting input (+) of amplifier 421. Similarly, digital-to-analog converter 417 may translate its received digital value into an analog voltage level, which applies to a noninverting input of amplifier 422. Amplifier 421 works as follows, and it is understood that amplifier 422 works similarly. Amplifier 421 may receive a voltage level at its noninverting input, and when that voltage level is higher than the voltage level of Vcontrol 1 (at the inverting input), then the output of the amplifier 421 increases, thereby increasing the voltage level of Vcontrol 1. However, if the voltage level at the noninverting input is lower than the voltage level of Vcontrol 1, then the diode in the amplifier 421 prevents a lower voltage from being output by amplifier 421, which may result in a floating voltage for Vcontrol 1.

In one example, PSU 401 outputs 500 W and receives 5 V and its control pin 491 as analog control voltage Vcontrol 1. Continuing with the example, PSU 402 may output 490 W while receiving 5 V as Vcontrol 2 at its control pin 492. However, system 400 may include a load sharing configuration of PSU 401 and PSU 402 in which both PSUs are expected to provide 1000 total watts of power at a given time. In this example, the system 400 is losing out on 10 W of power and is thus experiencing a performance shortfall commensurate with the 10 W of power.

Energy counters 403 and 404, respectively, measure PSU 401 outputting 500 W and measure PSU 402 outputting 490 W. The measurements from energy counters 403, 404 are input to calibration algorithm 411. Calibration algorithm 411 may then perform a method to tune out the error. An example method includes measuring a pin voltage at the control pin 492 of PSU 402, where the pin voltage is a measurement of the voltage level of Vcontrol 2 (in this example, 5 V). Calibration algorithm 411 also has data from energy counter 404 indicating that the power output of PSU 402 is 490 W.

Calibration algorithm 411 may then calculate an expected value for the pin voltage based on the power output of PSU 404. Assuming a linear relationship between voltage level of Vcontrol 2 and energy detected at energy counter 404, the expected pin voltage would be 4.9 V. Thus, there is an error of 0.1 V (2%). Calibration algorithm 411 may then raise the voltage level of Vcontrol 2 by multiplying its value by 1.02, which would provide a voltage level of Vcontrol 2 of 5.1 V.

In one example, digital voltage adjustment circuits 412, 413 are digital multiplier/divider circuits. Calibration algorithm 411 may then provide a digital signal to voltage adjustment circuit 412, where the digital signal indicates a magnitude of the error of 1.02. The voltage adjustment circuit 413 then multiplies its stored value by 1.02, outputs the new digital value to digital-to-analog converter 417, which then causes the voltage level of Vcontrol 2 to increase to 5.1 V. In this example, Vcontrol 1 would remain at 5 V, and Vcontrol 2 would be adjusted to 5.1 V. In other words, the Vcontrol voltage levels may be unique for each of the PSUs 401, 402.

In another example in which PSU 401 outputs a power that is lower than its faceplate limit or program to limit, calibration algorithm 411 may use voltage adjustment circuit 413 and digital-to-analog converter 414 similarly to control the voltage level of Vcontrol 1. In some systems, it may be more likely that one PSU operates at its limit, while another PSU operates below its limit. However, the scope of implementations is not so limited. Rather, the technique described with respect to system 400 may be applied to a system in which more than one PSU operates at an undesired level, whether that is above or below its faceplate limit or programmed limit. Additionally, various implementations may allow for iterative adjustment, so that the power controller 410 may perform the measurement and adjustment for either or both of PSU 401, 402 multiple times and over a period of time as appropriate.

Furthermore, real-world systems include errors, and it is understood that even with adjustment of the Vcontrol signals, either one or both of PSUs 401, 402 may deviate somewhat from 500 W. The technique described with respect to system 400 may allow the error to be identified and adjusted to within an acceptable range. In one example, as long as the various hardware allows, the range may be one or two orders of magnitude below the prescribed 2% error threshold. However, the scope of implementations is not limited to any error threshold.

Figure 5:
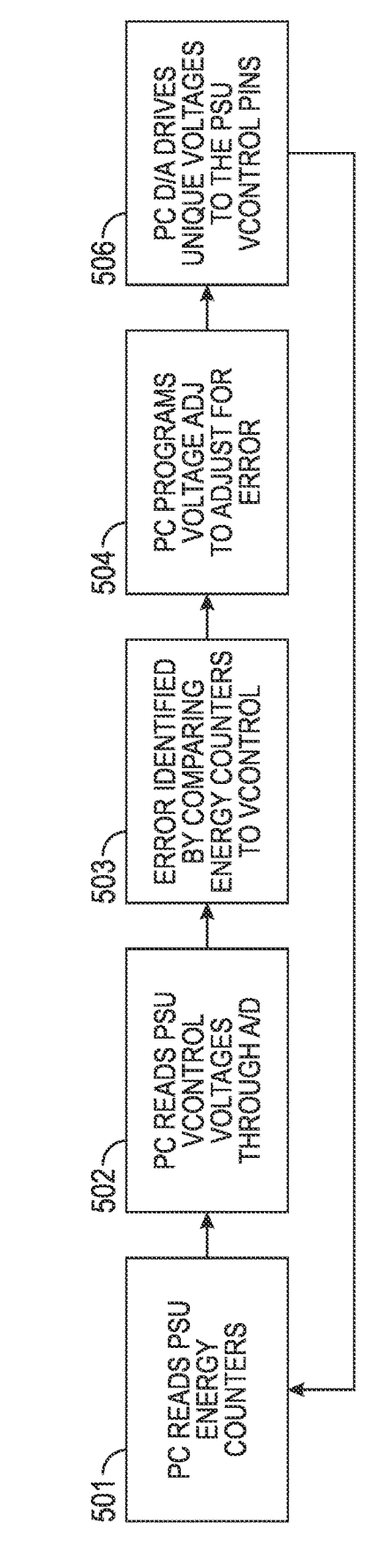
FIG. 5 is an illustration of an example method for controlling a PSU, according to various embodiments.

FIG. 5 is an illustration of an example method 500, for tuning out a load sharing error of a PSU, according to various embodiments. Method 500 may be performed by a processor, such as a BMC, as it executes computer-readable code to reduce or eliminate an error in performance of a PSU. FIG. 5 illustrates a technique to perform the error-reducing method described above with respect to FIG. 4.

At action 501, the power controller reads the energy counters. At action 502, the power controller reads the Vcontrol voltages through analog-to-digital converters. An example is shown in FIG. 4, in which power controller 410 reads a voltage level of Vcontrol 1 through analog-to-digital converter 414 and reads a voltage level of Vcontrol 2 through analog-to-digital converter 416.

At action 503, the power controller identifies an error by comparing the energy counter values to the Vcontrol values. In this example, an energy counter value may be related to a Vcontrol value by a function attributable to the associated PSU. As noted above, one way to do the comparison would be to calculate an expected value for a measured energy counter value. In the example above, the expected pin voltage value would be 4.9 V versus the measured value of 5.0 V, for an error of 2%.

At action 504, the power controller programs a voltage adjustment circuit to adjust for the error. At action 505, the power controller causes digital-to-analog converters to drive unique voltages to the PSU Vcontrol pins. For instance, the voltage level for Vcontrol 1 may be different from the voltage level for Vcontrol 2, even though either or both of PSU 401 and PSU 400 to have been adjusted to reduce error and be substantially at their configured power limits.

In the example of FIG. 5, the action 505 then loops back to action 501, thereby indicating that method 500 may be performed multiple times as appropriate. For instance, method 500 may be performed periodically, for a set number of times (e.g., three times), when either a Vcontrol voltage level is determined to be outside of a preferred range or a measured energy is determined to be outside of a preferred range, or the like.

FIG. 6 is an illustration of an example method 600, for tuning out a load sharing error of a PSU, according to various embodiments. Example method 600 may be performed by a processor, such as a BMC, as it executes computer-readable code to reduce or eliminate an error in performance of a PSU. FIG. 6 illustrates a technique to perform the error-reducing method described above with respect to FIG. 4.

Action 601 includes causing a first PSU and a second PSU to output power to a load. In one example, the first PSU and the second PSU are each subject to a power output limit. Thus, action 601 may include outputting a first analog voltage signal to the first PSU at a first level (e.g., 5 V) corresponding to the power output limit (e.g., 500 W) and outputting a second analog voltage signal to the second PSU at the first level (e.g., 5 V).

Action 602 includes measuring a power output from the first PSU and the power output from the second PSU. In the example of FIG. 4, energy counters 403, 404 are used to measure power output. For instance, power is energy per unit time, and each of the energy counters 403, 404 may output information sufficient for the power controller 410 to determine energy per unit time supplied by each of the PSUs 401, 402.

Action 603 includes determining that the second PSU is operating below the power output limit. In the example above, the power output limit is 500 W, whereas PSU 402 was operating at 490 W.

Action 604 includes calculating an error associated with the second analog voltage signal. In the example above, a 5 V value for the analog voltage signal would be expected to cause the second PSU to output 500 W. However, the power measurement and the voltage measurement allow the power controller to determine that the 5 V value for the analog voltage signal actually results in a 490 W output for the second PSU. Therefore, the error associated with the second analog voltage signal is that it results in a 2% error at the output of the PSU.

Action 605 includes adjusting the second analog voltage signal, according to the error. An example is given above with respect to FIG. 4, in which the calibration algorithm 411 causes the voltage adjustment circuit 412 to multiply a stored digital value by the magnitude of the error (e.g., 1.02) to result in an increase in the value of Vcontrol 2.

The scope of implementations is not limited to the series of actions of method 600. Rather, the scope of implementations may include adding, omitting, rearranging, or modifying various actions. For instance, some embodiments may include measuring and reducing an error on the first PSU additionally to, or instead of, measuring and reducing an error on the second PSU. Additionally, method 600 may be performed multiple times to iteratively reduce an error or to reduce an error that may change over time.

Also, while the examples above include PSUs that are paired and subject to a load sharing arrangement, the scope of embodiments may include adjusting power errors in PSUs that are in other arrangements. For instance, some implementations may include more than two PSUs, which are grouped and subject to a load sharing arrangement. The principles described above may be used just as well with three PSUs, four PSUs, or more. In fact, the principles described above may be used just as well with a single PSU to cause that PSU to operate at the desired level.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present implementation(s), as set forth in the claims below. Accordingly, the specification and figures are to be regarded in an illustrative rather than a restrictive sense, and all such modifications are intended to be included within the scope of the present implementation(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
   causing a first power supply unit and a second power supply unit to output power to a load, wherein the first power supply unit and the second power supply unit are each subject to a same power output limit, including outputting a first analog voltage signal to the first power supply unit at a first level corresponding to the power output limit and outputting a second analog voltage signal to the second power supply unit at the first level;
   measuring a power output from the first power supply unit and a power output from the second power supply unit;
   determining that the second power supply unit is operating below the power output limit;
   calculating an error associated with the second analog voltage signal; and adjusting the second analog voltage signal, according to the error,
   wherein measuring the power output from the first power supply unit and the power output from the second power supply unit comprises employing a first energy counter for the first power supply unit and a second energy counter for the second power supply unit in a feedback loop,
   wherein the feedback loop further includes a processor, configured to read the first energy counter and the second energy counter, a first digital voltage adjustment circuit configured to receive a first digital signal from the processor, a second digital voltage adjustment circuit configured to receive a second digital signal from the processor, and
   wherein adjusting the second analog voltage signal comprises: programming a digital value, corresponding to an amplitude of the error, into the second digital voltage adjustment circuit by the second digital signal.

2. The method of claim 1, further comprising:
   determining that the first power supply unit is operating at the power output limit.

3. The method of claim 1, wherein outputting the first analog voltage signal to the first power supply unit at the first level and outputting the second analog voltage signal to the second power supply unit at the first level results in a power output difference, and wherein adjusting the second analog voltage signal reduces the power output difference.

4. The method of claim 1, wherein calculating the error comprises:
   measuring a pin voltage at an input of the second power supply unit;
   calculating an expected value for the pin voltage based on measuring the power output from the second power supply unit; and
   comparing the pin voltage to the expected value for the pin voltage.

5. The method of claim 1, wherein the second analog voltage signal, after being adjusted according to the error, is at a higher voltage level than the first level.

6. The method of claim 1, wherein the power output limit is a programmable power limit, and wherein the first power supply unit and the second power supply unit are subject to a load sharing algorithm.

7. A system comprising:
   a server device having a plurality of central processing units;
   a first power supply and a second power supply, coupled to the server device and configured to provide power to the server device, wherein the first power supply and the second power supply are each subject to a same power output limit and are each configured to output a same power level to the server device;
   a first energy counter configured to measure a power output from the first power supply unit and a second energy counter configured to measure a power output from the second power supply;
   a first digital voltage adjustment circuit and a second digital voltage adjustment circuit; and
   a management controller, configured to communicate with the central processing units and with the first power supply and the second power supply, wherein the management controller is configured to:
      cause the first power supply and the second power supply to output power to the server device, including providing a first analog voltage signal to a pin of the first power supply at a first level and providing a second analog voltage signal to a pin of the second power supply at the first level;

read the first energy counter and the second energy counter;

determine, by reading the second energy counter, that the second power supply is operating below the power output limit;

determine an error amplitude associated with operation of the second power supply according to the first level and the power output from the second power supply; and adjust the second analog voltage signal from the first level, according to the error amplitude, including programming a digital value, corresponding to the error amplitude, into the second digital voltage adjustment circuit by a digital signal.

8. The system of claim 7, wherein the management controller comprises a Baseboard Management Controller.

9. The system of claim 7, wherein the first and second energy counters tap power lines serving the server device.

10. The system of claim 7, wherein the management controller is further configured to adjust the first analog voltage signal.

11. A computer-readable storage device having instructions stored thereon for supplying load sharing power to a device by a first power supply unit and a second power supply unit that are constrained by a same power output limit, wherein execution of the instructions by one or more processors of a management controller of the device causes the one or more processors to:

monitor power output by the first power supply unit and the second power supply unit by reading a first energy counter associated with the first power supply unit and reading a second energy counter associated with the second power supply;

determine that the first power supply unit is operating below a level of the second power supply unit;

determine an error associated with operation of the first power supply unit, wherein the error is associated with an analog control voltage applied to the first power supply unit and with a power output level of the first power supply unit;

adjust the analog control voltage according to the error by programming a digital value into a digital voltage adjustment circuit, wherein the digital value corresponds to an amplitude of the error;

measure a resulting power output level of the first power supply unit after adjusting the analog control voltage; and either adjust the analog control voltage again or allow the analog control voltage to remain at a level based on measuring the resulting power output level.

12. The computer-readable storage device of claim 11, wherein the instructions to cause the one or more processors to adjust the analog control voltage includes instructions to cause the one or more processors to adjust the analog control voltage to a level that is different from a level of a different analog control voltage applied to the second power supply unit.

13. The computer-readable storage device of claim 11, wherein the instructions to cause the one or more processors to adjust the analog control voltage includes instructions to cause the one or more processors to program the digital value by multiplying another value at the digital adjustment circuit by the amplitude of the error.

14. The computer-readable storage device of claim 11, wherein the instructions to cause the one or more processors to determine the error includes instructions to cause the one or more processors to:

measure a pin voltage at an input of the first power supply unit;

calculate an expected value for the pin voltage based on monitoring the power output from the first power supply unit; and compare the pin voltage to the expected value for the pin voltage.

15. The method of claim 1, wherein causing the first power supply unit and the second power supply unit to output power to the load comprises:

causing the first power supply unit and the second power supply unit to output power to a server device.

16. The method of claim 1, wherein causing the first power supply unit and the second power supply unit to output power to the load comprises:

causing the first power supply unit and the second power supply unit to output power to a data storage device.

17. The method of claim 1, wherein causing the first power supply unit and the second power supply unit to output power to the load comprises:

causing the first power supply unit and the second power supply unit to output power to a networking device.

18. The method of claim 1, wherein the method is performed by a Baseboard Management Controller.

19. The system of claim 7, further comprising:

a rack, wherein the server device is housed within the rack.

20. The system of claim 19, further comprising:

a power distribution unit, housed within the rack, wherein the power distribution unit is coupled to the first power supply and the second power supply and is further coupled to a power source.

* * * * *